US012585009B2

(12) United States Patent　　　　　(10) Patent No.:　　US 12,585,009 B2
Iizuka et al.　　　　　　　　　　　　(45) Date of Patent:　　Mar. 24, 2026

(54) RADAR APPARATUS, OBJECT DETECTION METHOD AND OBJECT DETECTION PROGRAM

(71) Applicant: NTT, Inc., Tokyo (JP)

(72) Inventors: Tatsuya Iizuka, Musashino (JP); Yohei Toriumi, Musashino (JP); Fumihiko Ishiyama, Musashino (JP); Jun Kato, Musashino (JP)

(73) Assignee: NTT, Inc., Tokyo (JP)

( * ) Notice: Subject to any disclaimer, the term of this patent is extended or adjusted under 35 U.S.C. 154(b) by 505 days.

(21) Appl. No.: 17/925,680

(22) PCT Filed: May 29, 2020

(86) PCT No.: PCT/JP2020/021328
　　§ 371 (c)(1),
　　(2) Date: Nov. 16, 2022

(87) PCT Pub. No.: WO2021/240776
　　PCT Pub. Date: Dec. 2, 2021

(65)　　　　　Prior Publication Data
　　US 2023/0194691 A1　　Jun. 22, 2023

(51) Int. Cl.
　　*G01S 13/536*　　　(2006.01)
　　*G01S 7/35*　　　　(2006.01)
　　　　　(Continued)
(52) U.S. Cl.
　　CPC ............ *G01S 13/536* (2013.01); *G01S 7/354* (2013.01); *G01S 7/415* (2013.01); *G01S 13/42* (2013.01)
(58) Field of Classification Search
　　CPC ........ G01S 13/536; G01S 13/42; G01S 7/354; G01S 7/415
　　See application file for complete search history.

(56)　　　　　References Cited

U.S. PATENT DOCUMENTS 6,657,577 B1 * 12/2003 Gregersen ................ G01V 3/12
　　　　　　　　　　　　　　　　　　343/793
2015/0109118 A1 * 4/2015 Urano ................... B60W 30/09
　　　　　　　　　　　　　　　　　　340/435
　　　　　　　(Continued)

FOREIGN PATENT DOCUMENTS

JP　　　　　5695830 B2 * 4/2015 ........... G01S 13/584
JP　　WO2019073597 A1 * 11/2019 ............. G01S 13/34
JP　　　　　7495248 B2 * 6/2024

OTHER PUBLICATIONS

Manokhin et al., "Music-based algorithm for range-azimuth FMCW radar data processing without estimating number of targets," 2015 IEEE 15th Mediterranean Microwave Symposium (MMS), 2015, 4 pages.

*Primary Examiner* — Jack W Keith
*Assistant Examiner* — Clayton Paul Ridder
(74) *Attorney, Agent, or Firm* — Fish & Richardson P.C.

(57)　　　　　ABSTRACT

A radar apparatus includes: a transmission unit that transmits a chirp signal; a reception unit that receives a reflected signal that is the chirp signal reflected by a scatterer; and a pole calculation unit that calculates a beat signal based on the chirp signal and the reflected signal and calculates a pole of the beat signal by eigenvalue decomposition of an autocorrelation matrix of the beat signal. The radar apparatus further includes: a complex amplitude calculation unit that calculates a complex amplitude corresponding to the pole by using a least squares method between a basis waveform corresponding to the pole and the beat signal; a distance calculation unit that calculates a distance to the scatterer based on the beat signal; and an intensity calculation unit that calculates an intensity of the reflected signal based on the complex amplitude.

6 Claims, 9 Drawing Sheets

(51) Int. Cl.
G01S 7/41          (2006.01)
G01S 13/42          (2006.01)

(56)                    References Cited

U.S. PATENT DOCUMENTS

2017/0363720 A1* 12/2017 Moriuchi .................. G01S 7/41
2020/0185804 A1* 6/2020 Watanabe ............. G01S 13/584

* cited by examiner

Fig. 4

| CENTER FREQUENCY | 24 GHz |
|---|---|
| BANDWIDTH | 150 MHz |
| DISTANCE RESOLUTION | 1 m |
| CHIRP TIME WIDTH | $300\,\mu$ sec |
| SAMPLING RATE | $1.8\,\mu$ sec |

DISTANCE [m]

RADAR APPARATUS, OBJECT DETECTION METHOD AND OBJECT DETECTION PROGRAM

CROSS-REFERENCE TO RELATED APPLICATIONS

This application is a National Stage application under 35 U.S.C. §371 of International Application No. PCT/JP2020/021328, having an International Filing Date of May 29, 2020, the disclosure of which is considered part of the disclosure of this application, and is incorporated by reference in its entirety into this application.

TECHNICAL FIELD

The present disclosure relates to a radar apparatus, an object detection method, and an object detection program.

BACKGROUND ART

Frequency Modulated Continuous Wave (FMCW) radar is adopted for the purpose of detecting target objects such as obstacles or people existing at distant positions.

The FMCW radar (a radar apparatus) transmits a chirp signal, which is a signal whose frequency changes (increases or decreases) linearly over time, from a transmitter, and receives the signal reflected by a target object at a receiver. A frequency and phase of the received signal change depending on a spatial information such as a position, speed, and angle of the target object. Thus, by Fourier transforming the received signal to calculate the frequency and phase, it is possible to measure a distance and angle from the transmitter to the target object, and further, it is possible to measure the speed of the target object (see, for example, NPL 1).

CITATION LIST

Non Patent Literature

NPL 1: "MUSIC-based algorithm for range-azimuth FMCW radar data processing without estimating number of targets"; Gleb O. Manokhin, Zhargal T. Erdyneev, Andrey A. Geltser, Evgeny A. Monastyrev; Published in: 2015 IEEE 15th Mediterranean Microwave Symposium (MMS).

SUMMARY OF THE INVENTION

Technical Problem

However, in the method of analyzing the received signal using the Fourier transform, the distance resolution is limited by a frequency bandwidth of the transmitted signal, and accordingly there is a problem that it is difficult to estimate the distance with high accuracy in a limited frequency bandwidth.

As another analysis method, a method is known which uses eigenvalue decomposition of an autocorrelation matrix represented by Multiple Signal Classification (MUSIC). According to this method, frequency of a received signal can be calculated with high accuracy without being limited by a frequency bandwidth, and a distance to a target object can be estimated. However, an intensity of the reflected signal obtained by using MUSIC is a pseudo power spectrum, and the reflected signal intensity corresponding to the frequency cannot be estimated accurately.

As described above, conventional FMCW radars have drawbacks that it is difficult to estimate both the distance from the radar apparatus to the target object and the reflected signal intensity by the target object with high accuracy.

The present disclosure has been made to solve such conventional problems, and an object of the present disclosure is to provide a radar apparatus, an object detection method, and an object detection program capable of estimating both the distance from a radar apparatus to a target object and a reflected signal intensity by the target object with high accuracy.

Means for Solving the Problem

A radar apparatus of an aspect of the present disclosure includes: a transmission unit that transmits a chirp signal; a reception unit that receives a reflected signal that is the chirp signal reflected by a target object; a pole calculation unit that calculates a beat signal based on the chirp signal and the reflected signal and calculates a pole of the beat signal by eigenvalue decomposition of an autocorrelation matrix of the beat signal; a complex amplitude calculation unit that calculates a complex amplitude corresponding to the pole by using a least squares method between a basis waveform corresponding to the pole and the beat signal; a distance calculation unit that calculates a distance to the target object based on the beat signal; and an intensity calculation unit that calculates an intensity of the reflected signal based on the complex amplitude.

An object detection method of an aspect of the present disclosure includes the steps of: transmitting a chirp signal; receiving a reflected signal that is the chirp signal reflected by a target object; calculating a beat signal based on the chirp signal and the reflected signal and calculating a pole of the beat signal by eigenvalue decomposition of an autocorrelation matrix of the beat signal; calculating a complex amplitude corresponding to the pole by using a least squares method between a basis waveform corresponding to the pole and the beat signal; calculating a distance to the target object based on the beat signal; and calculating an intensity of the reflected signal based on the complex amplitude.

An aspect of the present disclosure is an object detection program for causing a computer to operate as the radar apparatus described above.

Effects of the Invention

According to the present disclosure, it is possible to estimate the distance from the radar apparatus to the target object and the reflected signal intensity by the target object with high accuracy.

BRIEF DESCRIPTION OF DRAWINGS

FIG. 4 is a diagram illustrating various conditions set for the radar apparatus.

DESCRIPTION OF EMBODIMENTS

Figure 1:
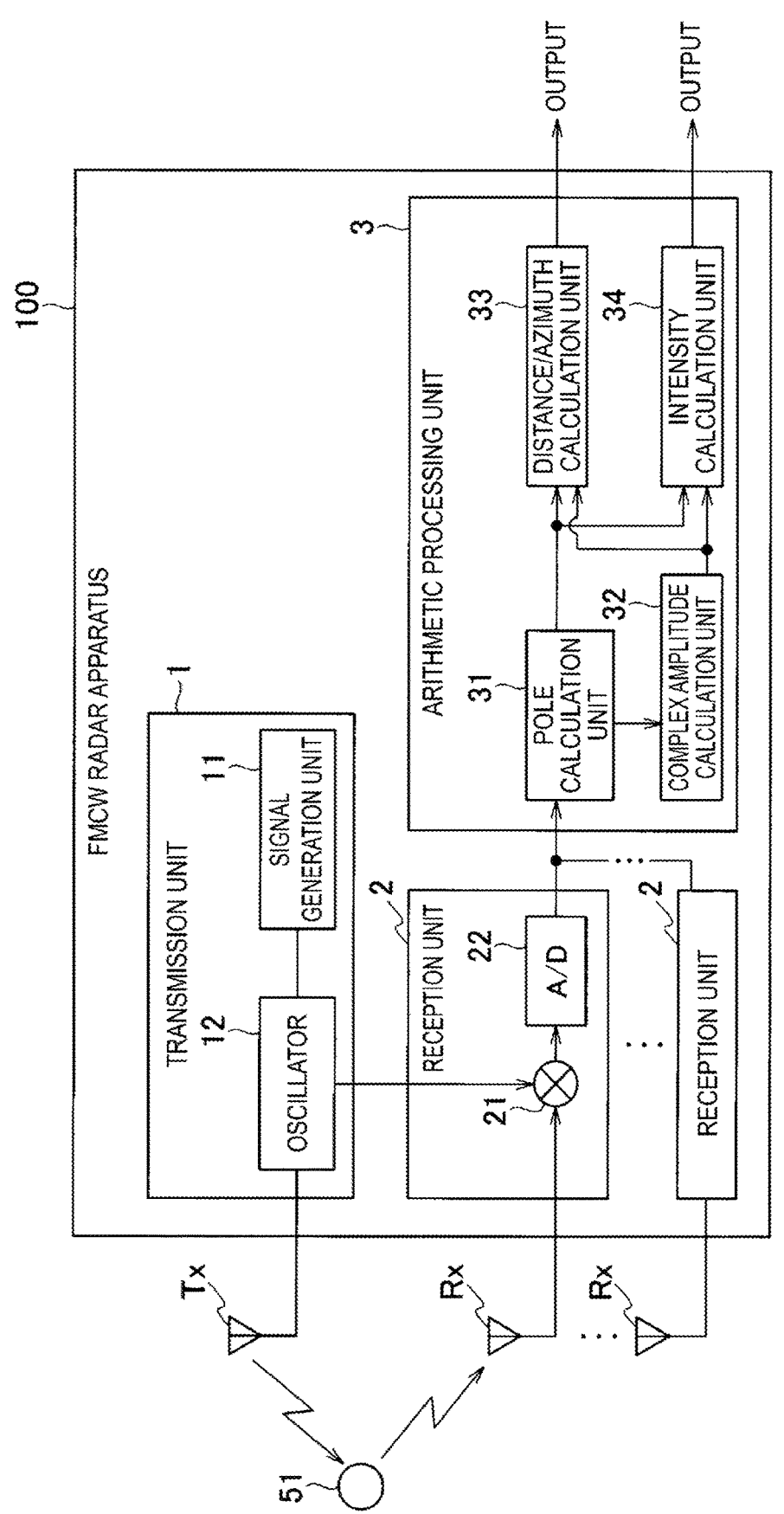
FIG. 1 is a block diagram illustrating a schematic configuration of a radar apparatus according to an embodiment of the present disclosure.

Hereinafter, embodiments of the present disclosure will be described with reference to the drawings. FIG. 1 is a block diagram schematically illustrating a configuration of an FMCW radar apparatus (hereinafter, abbreviated as "radar apparatus") in which an object detection method according to the present embodiment is adopted. As illustrated in FIG. 1, the radar apparatus 100 includes a transmission unit 1, a plurality of reception units 2, and an arithmetic processing unit 3.

The transmission unit 1 includes a signal generation unit 11 and an oscillator 12.

The signal generation unit 11 generates a chirp signal. The chirp signal is a signal with frequency increasing (up-chirp) or with frequency decreasing (down-chirp) over time.

The oscillator 12 is connected to the transmission antenna Tx, oscillates the chirp signal generated by the signal generation unit 11 to transmit the chirp signal to a scatterer 51 (a target object) whose distance and reflected signal intensity are to be measured. Examples of the scatterer 51 include various objects to be measured, such as a reflector installed on a road or a robot arm installed in a manufacturing factory.

Each reception unit 2 includes a mixer 21 and an A/D converter 22.

The mixer 21 is connected to a reception antenna Rx and acquires a received signal received by the reception antenna Rx. The mixer 21 also acquires the chirp signal transmitted from the oscillator 12. The mixer 21 also calculates a beat signal ("beat" generated by two signals) by multiplying the received signal and the chirp signal, and outputs the calculated beat signal to the A/D converter 22.

The A/D converter 22 converts the beat signal calculated by the mixer 21 into a digital signal and outputs the digital signal to the arithmetic processing unit 3.

The arithmetic processing unit 3 includes a pole calculation unit 31, a complex amplitude calculation unit 32, a distance/azimuth calculation unit 33, and an intensity calculation unit 34.

The pole calculation unit 31 calculates an autocorrelation matrix R of the beat signal s[n] output from the A/D converter 22, and performs eigenvalue decomposition of the autocorrelation matrix R to calculate an eigenvalue vector. Further, the pole calculation unit 31 calculates a pole of the beat signal s[n] based on the eigenvalue vector.

The complex amplitude calculation unit 32 calculates a complex amplitude of each frequency constituting the beat signal s[n] by computing the least squares method on an arithmetic equation of calculating the pole.

The distance/azimuth calculation unit 33 calculates a distance from the radar apparatus 100 to the scatterer 51 and an azimuth which is an angle with respect to a reference direction, based on the beat signal s[n] and each frequency included in the beat signal s[n]. The distance/azimuth calculation unit 33 has a function as a distance calculation unit. The distance/azimuth calculation unit 33 also has a function as an azimuth calculation unit.

The intensity calculation unit 34 calculates the absolute value of the complex amplitude based on a combination of the frequency and the complex amplitude included in the beat signal s[n], and calculates a scattering intensity corresponding to each frequency as the square of the absolute value of the complex amplitude.

[Estimation of Reflected Signal Intensity and Distance by SISO Radar]

Hereinafter, a method of estimating the distance and the reflected signal intensity of the scatterer 51 in a case where the radar apparatus 100 is a Single-Input Single-Output (SISO) radar will be described. Here, it is assumed that there are K scatterers 51. In the following, the K scatterers are referred to as scatterers 51-$k$ ($k$=1 to K). The distance from the radar apparatus 100 to each of the scatterers 51-$k$ is rk.

When the frequency bandwidth used in the chirp signal is smaller than a carrier frequency, the beat signal s[n] ($0 \leq t < T$; where T is a time width of the chirp signal) with the time stamp n received by the reception unit 2 of the radar apparatus 100 can be expressed by Equation (1) below.

[Math. 1]

$$s[n] = \sum_{k=1}^{K} c_k e^{j2\pi f_k t} + w(n), \quad f_k = \frac{2Br_k}{cT} \tag{1}$$

In Equation (1), "ck" indicates a complex amplitude, "B" indicates a bandwidth used, "c" indicates the speed of light, and "w(n)" indicates a noise component.

In Equation (1), the frequency fk is to be estimated with high accuracy and then this "fk" is to be applied to the equation of the beat signal s[n] to thereby estimate the complex amplitude ck with high accuracy. In the present embodiment, first, the frequency fk forming the beat signal s[n] is obtained by using the analysis technique of "root-MUSIC". After that, the complex amplitude ck corresponding to each frequency fk is calculated such that an approximation error with the beat signal s[n] is minimized. Detailed description will be given below.

After the beat signal s[n] is detected by the mixer 21 of the reception unit 2, the pole calculation unit 31 of the arithmetic processing unit 3 calculates the autocorrelation matrix R of the beat signal s[n]. The pole calculation unit 31 also performs the eigenvalue decomposition of the autocorrelation matrix R to calculate an eigenvalue and an eigenvector. At this time, by using an eigenvector em (K<m≤M) corresponding to noise, the polynomial expressed by Equation (2) below is solved to obtain the pole zm of the beat signal.

[Math. 2]

$$Q(z) = \sum_{i=K+1}^{M} p^t(z^{-1}) e_i e_i^H p(z) = 0 \tag{2}$$

In Equation (2), $p(z)=[1, z, z^2, \ldots z^{M-1}]^t$ (t indicates transposition). In Equation (2), "H" indicates the Hamiltonian matrix.

Then, by solving the polynomial expressed by Equation (2) above, "z" satisfying the function $Q(z)=0$ is calculated, and the pole zm for each eigenvector em is calculated. The calculated pole zm is a complex number and can be expressed by Equation (3) below.

[Math. 3]

$$z_m = \exp(\lambda_m \Delta t + j2\pi f_m \Delta t) \tag{3}$$

As expressed by Equation (3), the pole zm is expressed by $\lambda m$ representing the rate of increase/decrease in amplitude and fm representing the frequency. As expressed by Equation (1), in the chirp signal (a scattered wave) output from the radar apparatus 100, $\lambda m=0$ ($|zm|=1$).

However, in the calculated pole zm, the condition of "$\lambda m=0$" is not satisfied due to the influence of noise. Thus, the analysis accuracy is enhanced by setting a threshold value $\lambda th$ of $\lambda m$ and excluding the pole zm where $|\lambda m|>\lambda th$.

By considering the pole xm calculated by Equation (4) below as the pole forming a signal such that $\lambda m=0$ with respect to a selected pole zm, the analysis accuracy can be further enhanced.

[Math. 4]

$$x_m = \frac{z_m}{|z_m|} = e^{j2\pi f_m \Delta t} \tag{4}$$

The pole xm calculated by Equation (4) above is a pole forming the beat signal $s[n]$. The complex amplitude calculation unit 32 calculates the complex amplitudes $c_1$ to $c_{M-P}$ by using the least squares method with respect to the arithmetic equation expressed by Equation (5) below.

[Math. 5]

$$E = \left\| \begin{pmatrix} 1 & 1 & \cdots & 1 \\ x_1 & x_2 & \cdots & x_{M-P} \\ x_1^2 & x_2^2 & \cdots & x_{M-P}^2 \\ \vdots & \vdots & \cdots & \vdots \\ x_1^{N-1} & x_2^{N-1} & \cdots & x_{M-P}^{N-1} \end{pmatrix} \cdot \begin{pmatrix} c_1 \\ c_2 \\ \vdots \\ c_{M-P} \end{pmatrix} - \begin{pmatrix} s[0] \\ s[1] \\ \vdots \\ s[N-1] \end{pmatrix} \right\|^2 \tag{5}$$

In other words, the complex amplitude cm (m=1 to M-P) that minimizes "E" expressed by Equation (5) is calculated.

Then, a combination of the frequency and the complex amplitude (fm, cm) is obtained by Equation (5) above. The intensity calculation unit 34 calculates the scattering intensity corresponding to fm as "$|cm|^2$" by obtaining the absolute value of the complex amplitude cm. In the computation method according to the embodiment, validity of an analysis result can be determined by approximating an analysis signal from the calculated combination of the frequency and the complex amplitude (fm, cm) and evaluating the approximation error. The number K of the scatterers 51 can be estimated.

Specifically, Q bases (fm, cm) having the largest absolute value $|cm|$ of the complex amplitude are extracted. In a case where the number K of the scatterers 51 is unknown, as expressed by Equation (5), the number K can be estimated by finding the minimum Q having the approximation error equal to or less than a noise level, and it can be determined that the estimation result is valid.

The distance/azimuth calculation unit 33 calculates a distance rk by substituting the above-described basis (fm, cm) into Equation (1) described above.

In this way, the SISO radar can estimate the distance to the scatterer 51 and the reflected signal intensity with high accuracy.

[Estimation of Reflected Signal Intensity and Distance by MIMO Radar]

Next, a description will be given regarding a method of estimating the distance and the reflected signal intensity of the scatterer 51 in a case where the radar apparatus 100 is a Multi-Input Multi-Output (MIMO) radar. In the MIMO radar, the reflected signal intensity at the scatterer 51 is estimated with high accuracy and a two-dimensional position (distance and azimuth) of the scatterer 51 is estimated with high accuracy by expanding the method of estimating the reflected signal intensity and the distance implemented by the SISO radar described above.

Each distance of the K scatterers 51-$k$ (k=1 to K) from the radar apparatus 100 is denoted by rk. Each azimuth (azimuth direction) of the K scatterers 51-$k$ (k=1 to K) with respect to a reference direction is denoted by $\theta k$. In other words, it is assumed that the K scatterers 51-$k$ are at positions (rk, $\theta k$) with respect to the radar apparatus 100 serving as a reference.

Assuming that the received signal at the time stamp n and the reception antenna Rx "l" (l=1 to L; L is the number of antennas) is $s(l)[n]$, the received signals $s(l)[n]$ can be expressed by Equation (6) below.

[Math. 6]

$$s^{(l)}[n] = \sum_{k=1}^{K} c_k e^{j2\pi f_k n\Delta t} \cdot e^{j2\pi \frac{d\sin\theta_l}{\lambda}} + w(n) \tag{6}$$

$$= \sum_{k=1}^{K} c_k^{(l)} \cdot e^{j2\pi f_k n\Delta t} + w(n)$$

In Equation (6), "d" indicates a distance between the plurality of reception antennas Rx. "$\lambda$" indicates the wavelength. Then, (rk, $\theta k$) is estimated by using the received signals received by the L reception antennas Rx "l". Thus, $\theta k$ is calculated by considering the reflected signal intensity by the SISO radar described above and the phase of the complex amplitude cm calculated at the time of estimating the distance.

Figure 2:
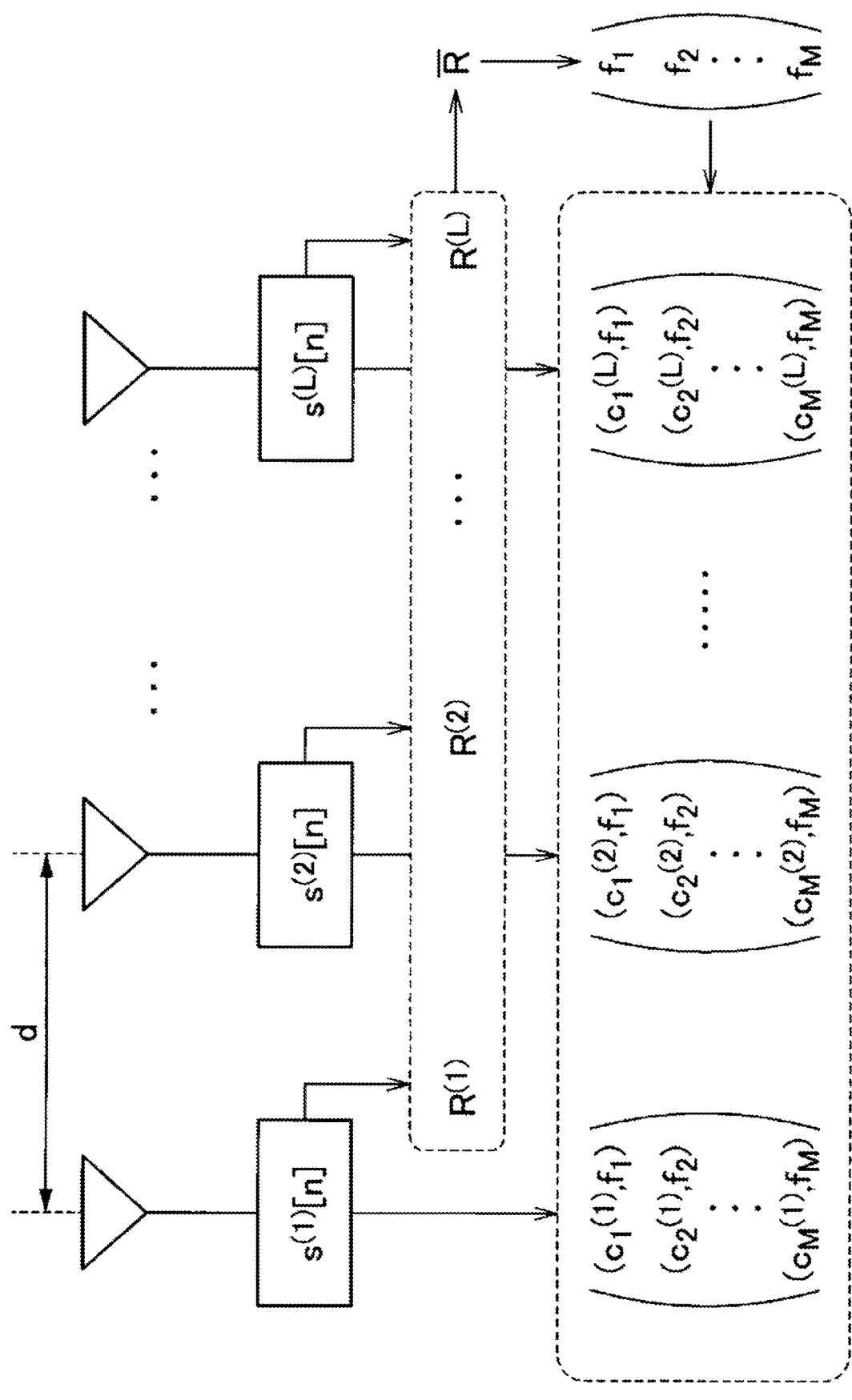
FIG. 2 is a block diagram illustrating a process of signal processing in estimating a reflected signal intensity, distance, and angle.

FIG. 2 is a block diagram illustrating a process of signal processing in estimating the reflected signal intensity, distance, and azimuth. At this time, it is necessary that the poles detected match at all antennas. Thus, as the autocorrelation matrix R used in calculating the pole, an average R(−) of the autocorrelation matrix R(l) of each reception antenna Rx "l" is obtained as expressed by Equation (7) below.

$$\bar{R} = \frac{1}{L} \sum_{l=1}^{L} R^{(l)} \tag{7}$$

The pole is calculated by using the algorithm of "root-MUSIC" for the obtained average R(−). Assuming that the complex amplitude for the reception antenna Rx "l" and the frequency fm is cm(l), the complex amplitude cm(l) can be calculated by adopting Equation (4) described above.

It is assumed that a maximum of I (I<L) scatterers 51 exist at positions where the distances from the radar apparatus 100 are the same and the azimuths are different from each other. At this time, the complex amplitude cm(l) can be expressed by Equation (8) below.

[Math. 8]

$$c_m^{(l)} = \sum_{i=1}^{I} x_i e^{j\omega_i l} + w(l) \tag{8}$$

Equation (8) above has a similar form to Equation (1) described above. Thus, by adopting a similar method to the case of the SISO radar described above, xp and ωp in Equation (8) can be calculated. By using the calculated xp and ωp (phase rotation speed of complex amplitude), the azimuth Oi of the scatterer 51 and the reflected signal intensity Pi can be calculated by Equations (9) and (10) below.

[Math. 9]

$$\theta_i = \sin^{-1}\left(\frac{\lambda}{2\pi d}\omega_i\right) \tag{9}$$

[Math. 10]

$$P_i = |x_i|^2 \tag{10}$$

Since the frequency fk is expressed by Equation (1) described above, the distance rk to the scatterer 51 can be calculated by the frequency fk and Equation (6) described above. In other words, by adopting MIMO, the distances and azimuths of the plurality of scatterers 51-1 to 51-*k* can be obtained, and therefore the two-dimensional position of each of the scatterers 51-1 to 51-*k* can be estimated. The reflected signal intensities can also be estimated.

Description of Examples

Next, a description will be given regarding a specific examples for estimating the distance and the reflected signal intensity of the scatterer 51 by using the radar apparatus 100 according to the embodiment. The inventors adopted a corner reflector (hereinafter abbreviated as "reflector") as an example of the scatterer 51, and conducted experiments to estimate the position of the reflector and the reflected signal intensity reflected by the reflector by using the radar apparatus 100 according to the embodiments described above.

Figure 3A:
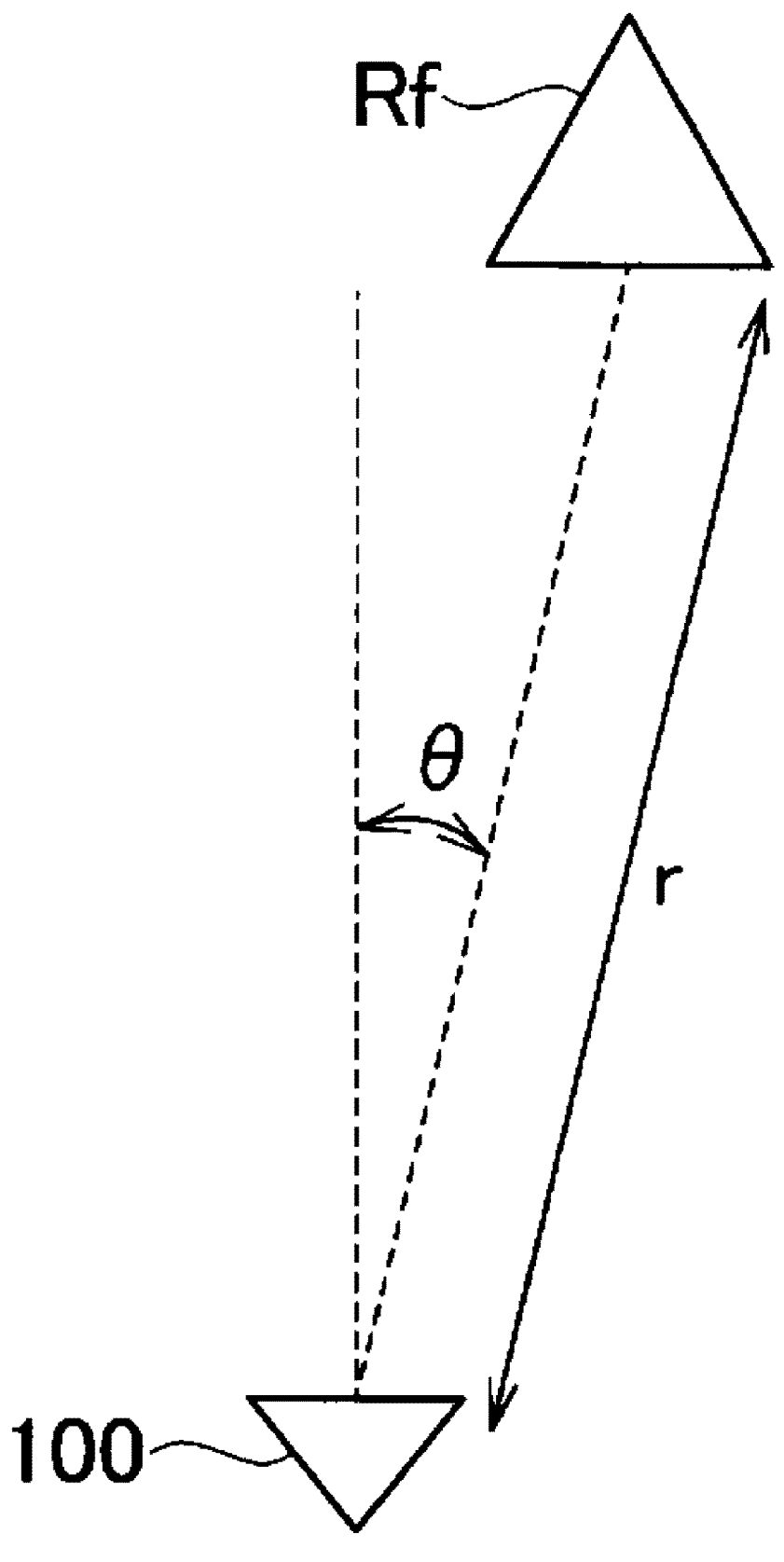
FIG. 3A is an explanatory diagram schematically illustrating a positional relationship between a radar apparatus and a reflector in implementing Experiments 1 to 3.
Figure 3B:
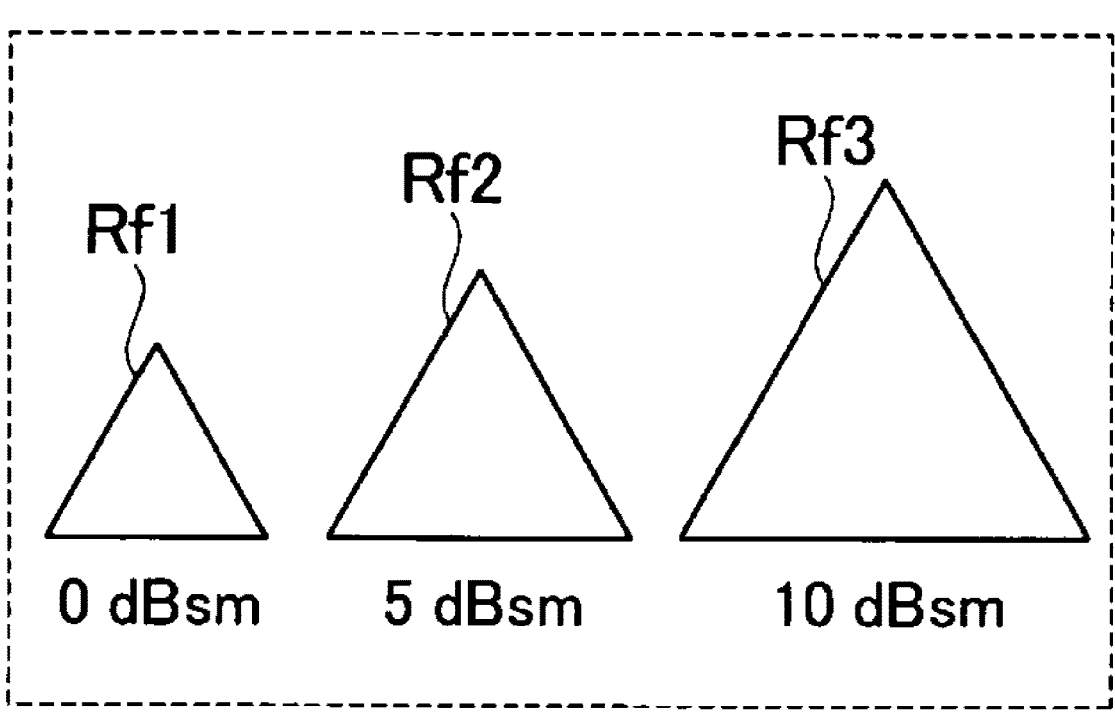
FIG. 3B is an explanatory diagram illustrating three reflectors having different scattering cross sections.

FIG. 3A is an explanatory diagram schematically illustrating a positional relationship between the radar apparatus 100 and a reflector Rf in conducting Experiments 1 to 3 illustrated below. FIG. 3B is an explanatory diagram illustrating three reflectors Rf1, Rf2, and Rf3 having different scattering cross sections. FIG. 4 is a diagram illustrating various conditions set for the radar apparatus 100. The radar apparatus 100 used in the experiments includes two transmission antennas Tx and four reception antennas Rx having isotropic properties in the reference direction.

In Experiment 1, one transmission antenna Tx and one reception antenna Rx were used, and the distance and the reflected signal intensity were estimated in a case where there was one reflector. In Experiment 2, one transmission antenna Tx and one reception antenna Rx were used, and the distance and the reflected signal intensity were estimated in a case where there were two reflectors. In Experiment 3, two transmission antennas Tx and four reception antennas Rx were used, and the distance and azimuth and the reflected signal intensity were estimated in a case where there were two reflectors.

In Experiments 1 to 3, two experiments were performed in which only the scattering cross section (SCS) of the reflector was changed in order to evaluate the estimation accuracy of the reflected signal intensity and the distance. Given the scattering cross section of the reflector, the ratio Pr of the reflected signal intensity by the reflectors having different sizes can be expressed by Equation (11) below.

[Math. 11]

$$P_r = \frac{P_2}{P_1} = \frac{\sigma_2}{\sigma_1} \tag{11}$$

In Equation (11), σ1 and σ2 are the scattering cross sections of the reflectors used in each experiment, and P1 and P2 are the reflected signal intensities from respective reflectors.

As illustrated in FIG. 4, the conditions of the radar apparatus 100 used in the experiments are such that the center frequency=24 [GHz], the bandwidth B=150 MHz, and the distance resolution Δr=1 m. In order to confirm the estimation accuracy of the reflected signal intensity, the reflectors (Rf1, Rf2, and Rf3 illustrated in FIG. 3B) having three scattering cross sections σ of σ=0, σ=5, and σ=10 [dBsm] were used.

<Experiment 1>

As described above, in Experiment 1, one transmission antenna Tx and one reception antenna Rx were used, and the distance to the reflector and the reflection intensity by the reflector were estimated in the case where there was one reflector.

In order to verify the estimation accuracy of the reflected signal intensity and the distance, the reflector was installed at a position 2.5 m away from the radar apparatus 100. As the reflector, the reflector Rf1 having the scattering cross section σ of 0 [dBsm] and the reflector Rf3 having the scattering cross section σ of 10 [dBsm] were prepared, and the reflected signal intensities were measured for each of the reflectors Rf1 and Rf3. The reflected signal intensities of the two reflectors Rf1 and Rf3 are analyzed, and if the ratio of the two reflected signal intensities is Pr=10 dB, it is assumed that the reflected signal intensities are accurately estimated.

Figure 5:
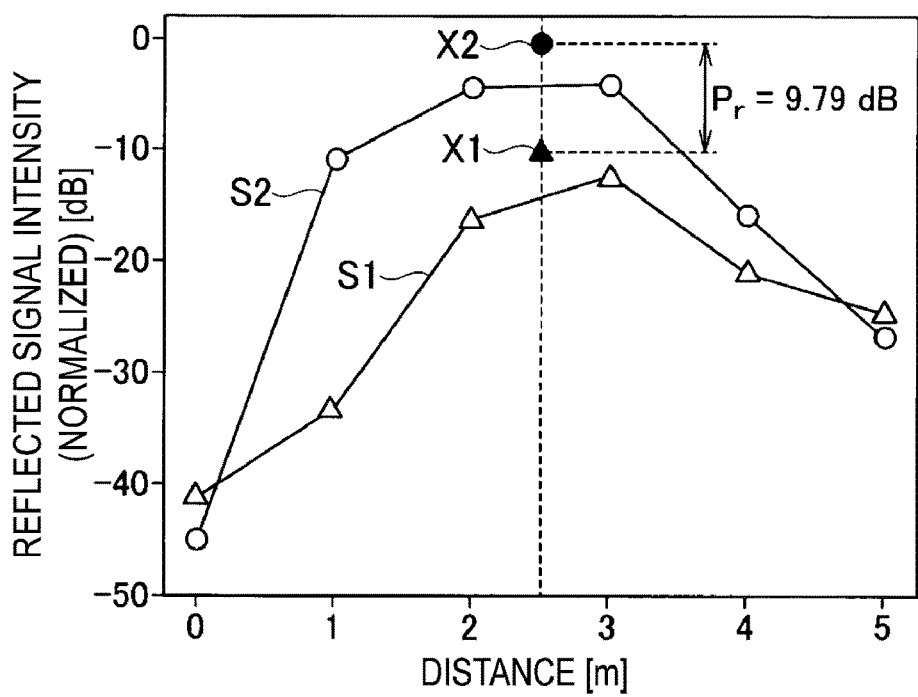
FIG. 5 is a graph illustrating a relationship between a distance from the radar apparatus to the reflector and the normalized reflected signal intensity according to Experiment 1.

FIG. 5 is a graph illustrating the relationship between the distance [m] from the radar apparatus 100 to the reflector and the normalized reflected signal intensity [dB]. The curve S1 indicated by "white triangle" in FIG. 5 is a graph illustrating the reflected signal intensity calculated by installing the reflector having the scattering cross section σ of 0 [dBsm] at each distance and using an approach of a Fast Fourier Transform (FFT). The curve S2 indicated by "white circle" is a graph illustrating the reflected signal intensity calculated by installing the reflector having the scattering cross section σ of 10 [dBsm] at each distance and using an FFT approach.

The point X1 indicated by "filled triangle" in FIG. 5 indicates the reflected signal intensity estimated by using the computation method of the present embodiment for the reflector Rf1 having the scattering cross section σ of 0 [dBsm]. The point X2 indicated by "filled circle" indicates the signal intensity estimated by using the computation method of the present embodiment for the reflector Rf3 having the scattering cross section σ of 10 [dBsm]. In a case where the computation method of the present embodiment is adopted, Pr=9.79 (≈10) [dB] is obtained, and it is understood that the reflected signal intensity is estimated with high accuracy as compared with the case where the FFT approach is adopted.

<Experiment 2>

As described above, in Experiment 2, one transmission antenna Tx and one reception antenna Rx were used, and the distance and the reflected signal intensity of each reflector were estimated in the case where two reflectors (first reflector and second reflector) were installed.

In order to verify the estimation accuracy of the reflected signal intensity and the distance, a first reflector was installed at a position 2 m from the radar apparatus, and a second reflector was installed at a position 2.5 m from the radar apparatus.

As the first reflector, two reflectors Rf1 and Rf3 having the scattering cross sections σ of 0 [dBsm] and 10 [dBsm] were prepared, and the reflected signal intensity was measured for each first reflector. The reflected signal intensity of each first reflector is analyzed, and if the ratio of the reflected signal intensities is Pr=10 dB, it is assumed that the reflected signal intensities with respect to the first reflectors are accurately estimated.

As the second reflector, two reflectors Rf1 and Rf2 having the scattering cross sections σ of 0 [dBsm] and 5 [dBsm] were prepared, and the reflected signal intensity was measured for each second reflector. The reflected signal intensity of each second reflector is analyzed, and if the ratio of the reflected signal intensities is Pr=5 dB, it is assumed that the reflected signal intensities with respect to the second reflectors are accurately estimated.

Figure 6:
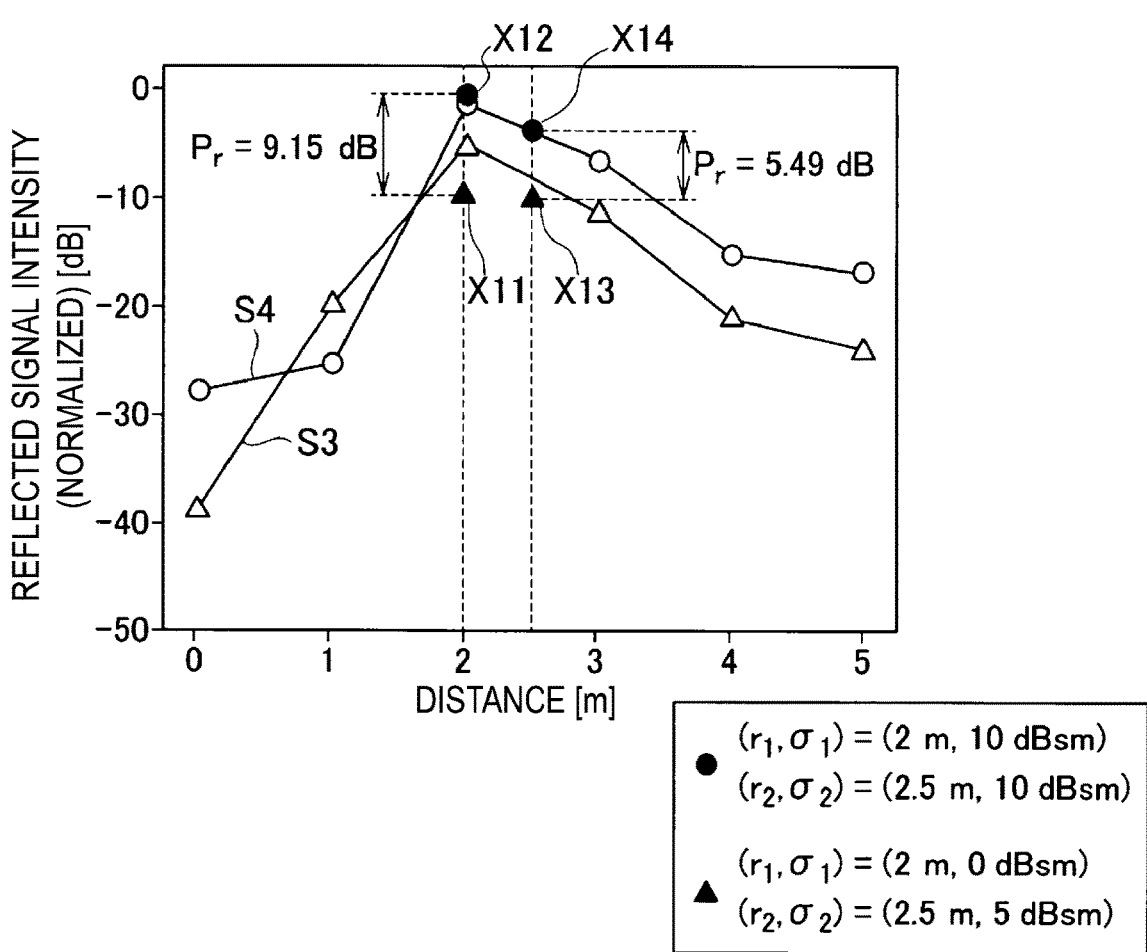
FIG. 6 is a graph illustrating the relationship between the distance from the radar apparatus to the reflector and the normalized reflected signal intensity according to Experiment 2.

FIG. 6 is a graph illustrating a relationship between the distance [m] from the radar apparatus 100 to the reflector and a normalized reflected signal intensity [dB]. The curve S3 indicated by "white triangle" in FIG. 6 is a graph illustrating the reflected signal intensity calculated by installing the reflector having the scattering cross section σ of 0 [dBsm] at each distance and using an FFT approach. The curve S4 (black-line circle) indicated by "white circle" is a graph illustrating the reflected signal intensity calculated by installing the reflector having the scattering cross section σ of 5 [dBsm] at each distance and using an FFT approach.

The point X11 indicated by "filled triangle" in FIG. 6 indicates the reflected signal intensity estimated by adopting the computation method according to the present embodiment for the reflector having the scattering cross section σ of 0 [dBsm] installed at the distance of 2 m. The point X12 indicated by "filled circle" indicates the signal intensity estimated by adopting the computation method according to the present embodiment for the reflector having the scattering cross section σ of 10 [dBsm] installed at the distance of 2 m. In a case where the computation method of the present embodiment is adopted, Pr=9.15 (≈10) [dB] is obtained, and it is understood that the reflected signal intensity is estimated with high accuracy as compared with the case where the FFT approach is adopted.

The point X13 indicated by "filled triangle" in FIG. 6 indicates the reflected signal intensity estimated by adopting the computation method according to the present embodiment for the reflector having the scattering cross section σ of 5 [dBsm] installed at the distance of 2.5 m. The point X14 indicated by "filled circle" indicates the reflected signal intensity estimated by adopting the computation method according to the present embodiment for the reflector having the scattering cross section σ of 10 [dBsm]. In a case where the computation method of the present embodiment is adopted, Pr=5.49 (≈5) [dB] is obtained, and it is understood that the reflected signal intensity is estimated with high accuracy as compared with the case where the FFT approach is adopted.

In other words, by adopting the computation method of the present embodiment, the distance between the two reflectors can be estimated with high accuracy, and the reflected signal intensity by each reflector can be estimated with high accuracy.

<Experiment 3>

As described above, in Experiment 3, two transmission antennas Tx and four reception antennas Rx were used, and the two-dimensional position (distance and azimuth) of each reflector and the reflected signal intensity were estimated in the case where two reflectors (first reflector and second reflector) were provided.

Figure 7:
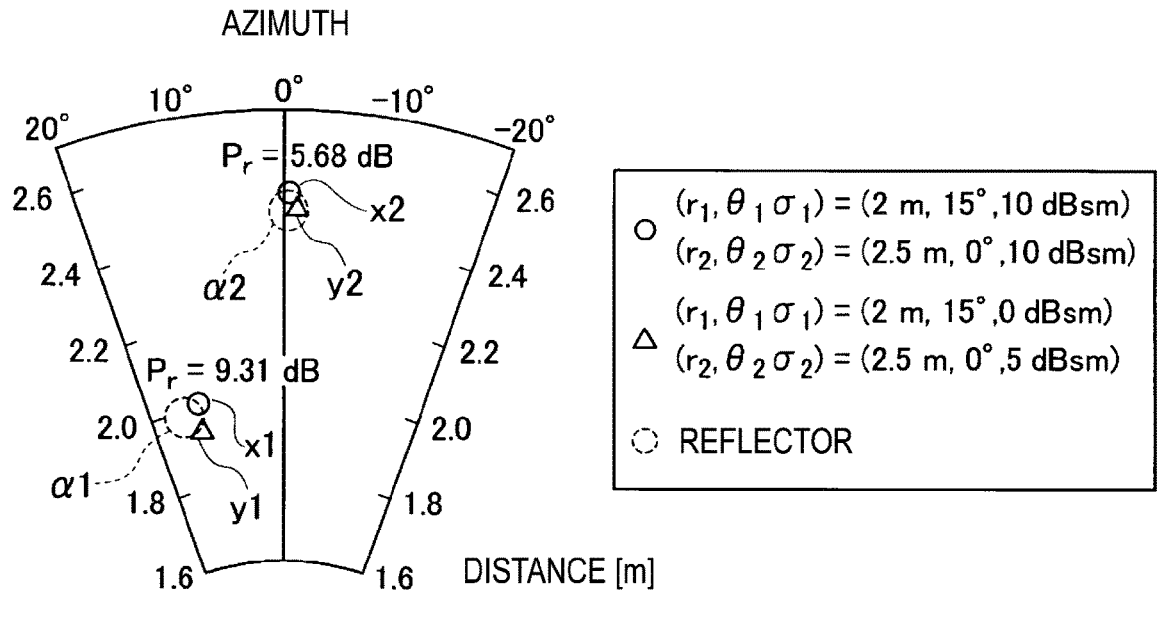
FIG. 7 is an explanatory diagram illustrating the distance and angle from the radar apparatus to the reflector and a ratio Pr of the reflected signal intensity according to Experiment 3.

Specifically, as illustrated in FIG. 7, the first reflector α1 was installed at the position of the distance r1 and the azimuth θ1, and the second reflector α2 was installed at the position of the distance r2 and the azimuth θ2.

In the first setup of the reflectors, the first reflector α1 was set such that (r1, θ1, σ1)=(2 m, 15°, 10 [dBsm]), and the second reflector α2 was set such that (r2, θ2, σ2)=(2.5 m, 0°, 10 [dBsm]). In other words, the reflected signal intensity was measured by installing a reflector having a scattering cross section σ of 10 [dBsm] as the first reflector α1, and a reflector having a scattering cross section σ of 10 [dBsm] as the second reflector α2.

As a result, as illustrated in FIG. 7, a point x1 was detected for the first reflector α1, and a point x2 was detected for the second reflector α2.

Next, in the second setup of the reflectors, the first reflector α1 was set such that (r1, θ1, σ1)=(2 m, 15°, 0 [dBsm]), and the second reflector α2 was set such that (r2, θ2, σ2)=(2.5 m, 0°, 5 [dBsm]). In other words, the reflected signal intensity was measured by installing a reflector having a scattering cross section σ of 0 [dBsm] as the first reflector α1, and a reflector having a scattering cross section σ of 5 [dBsm] as the second reflector α2.

As a result, as illustrated in FIG. 7, a point y1 was detected for the first reflector α1, and a point y2 was detected for the second reflector α2.

Pr in the first reflector α1 was 9.31 (≈10) [dB], and Pr in the second reflector α2 was 5.68 (≈5) [dB]. Thus, it is understood that the two-dimensional positions and the reflected signal intensities of the first and second reflectors α1 and α2 are estimated with high accuracy.

The estimated position errors were within 0.1 m in each. Considering that the distance resolution by the FFT is 1 m and the angle resolution is 14°, it can be understood that the position estimation accuracy is extremely high by adopting the method according to the present embodiment. The ratios of the estimated reflected signal intensities were 9.31 [dBsm] and 5.68 [dBsm], and it was confirmed that the reflected signal intensities were also estimated with high accuracy.

Description of Effects of Present Embodiment

In this way, in the radar apparatus 100 according to the present embodiment, the reflected signal reflected by the scatterer 51 (target object) is received by the reception unit 2, the autocorrelation matrix of the reflected signal is calculated, and the pole is further calculated by the eigenvalue decomposition of the autocorrelation matrix. The complex amplitude corresponding to the pole is calculated by using the signal of the basis waveform corresponding to the calculated pole and the least squares method. The absolute value of the calculated complex amplitude is calculated as the intensity of the pole, and the reflected signal intensity by the scatterer 51 is calculated. The distance of the scatterer 51 is calculated from the basis waveform. Accordingly, it is possible to estimate the reflected signal intensity and the distance of the scatterer 51 with high accuracy.

The reflected signal intensity varies depending on the size, shape, and material of the scatterer 51. According to the present embodiment, the reflected signal intensity can be estimated with high accuracy, and therefore it is possible to acquire various information related to the scatterer 51 such as the size, shape, and material of the scatterer 51.

In the present embodiment, the complex amplitude calculation unit 32 calculates the complex amplitude only for the pole having the absolute value component less than a preset threshold value among the plurality of poles calculated by the eigenvalue decomposition. In other words, the threshold value $\lambda$th is set for $\lambda$m, which is the amplification factor of the amplitude, and the poles where $|\lambda m|>\lambda$th are excluded. Accordingly, it is possible to enhance the analysis accuracy of the distance and the reflected signal intensity.

Further, in the present embodiment, the azimuth of the target object is calculated based on the phase rotation speeds of the plurality of complex amplitudes. Therefore, it is possible to estimate the two-dimensional position of the target object with high accuracy.

Figure 8:
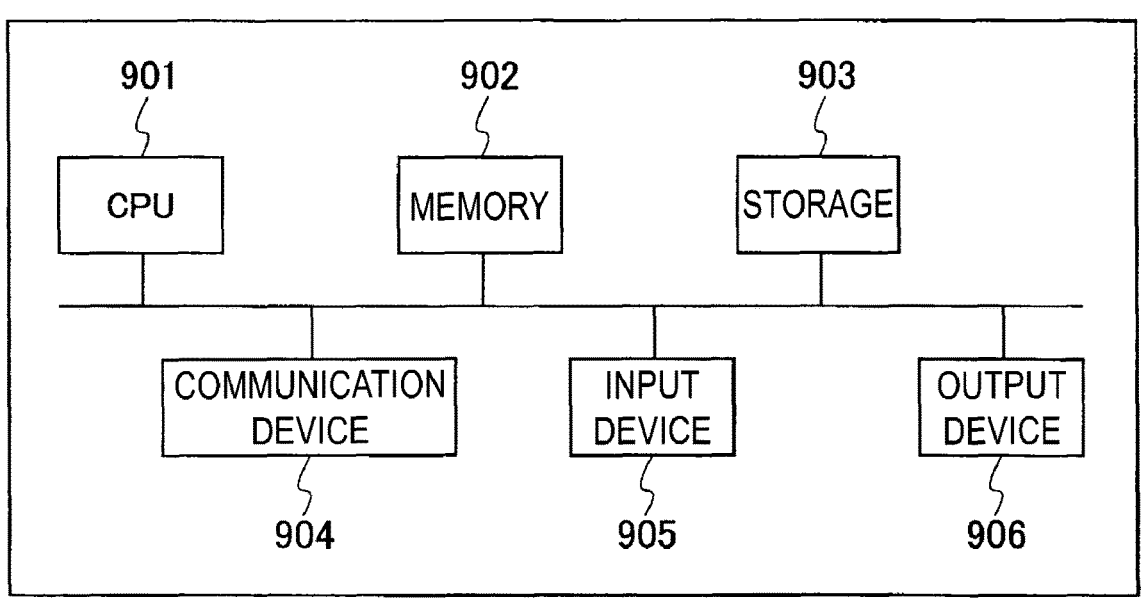
FIG. 8 is a block diagram illustrating a functional configuration of the radar apparatus according to the present disclosure.

For example, as illustrated in FIG. 8, as the radar apparatus 100 according to the present embodiment described above, a general-purpose computer system can be used which includes a Central Processing Unit (CPU, processor) 901, a memory 902, a storage 903 (Hard Disk Drive (HDD), Solid State Drive (SSD)), a communication device 904, an input device 905, and an output device 906. The memory 902 and the storage 903 are storage devices. In the computer system, the CPU 901 executes a predetermined program loaded in the memory 902 to cause the radar apparatus 100 to implement each function.

Note that the radar apparatus 100 may be implemented by one computer or may be implemented by a plurality of computers. The radar apparatus 100 may also be a virtual machine implemented on a computer.

Note that the program for the radar apparatus 100 may be stored in a computer-readable recording medium such as a HDD, a SSD, a Universal Serial Bus (USB) memory, a Compact Disc (CD), or a Digital Versatile Disc (DVD), or may be distributed via a network.

The present disclosure is not limited to the embodiments described above, and various modifications can be made within the scope of the gist of the present disclosure.

REFERENCE SIGNS LIST

1 Transmission unit
2 Reception unit
3 Arithmetic processing unit
11 Signal generation unit
12 Oscillator
21 Mixer
22 A/D converter
31 Pole calculation unit
32 Complex amplitude calculation unit
33 Distance/azimuth calculation unit
34 Intensity calculation unit
51 (50-1 to 50-$k$) Scatterer
100 Radar apparatus
Rx Reception antenna
Tx Transmission antenna

The invention claimed is:

1. A radar apparatus comprising:
a transmission unit, including one or more processors, configured to transmit a chirp signal;
a reception unit, including one or more processors, configured to receive a reflected signal that is the chirp signal reflected by a target object;
a pole calculation unit, including one or more processors, configured to calculate a beat signal based on the chirp signal and the reflected signal and calculate a plurality of poles of the beat signal by eigenvalue decomposition of an autocorrelation matrix of the beat signal;
a complex amplitude calculation unit, including one or more processors, configured to calculate a complex amplitude of a pole having an absolute value component less than a preset threshold value among the plurality of the poles by using a least squares method between a basis waveform corresponding to the pole and the beat signal;
a distance calculation unit, including one or more processors, configured to calculate a distance to the target object based on the beat signal; and
an intensity calculation unit, including one or more processors, configured to calculate a scattering intensity of the target object as a square of an absolute value of the complex amplitude.

2. The radar apparatus according to claim 1, wherein
the reception unit is configured to receive reflected signals from a plurality of reception antennas,
the pole calculation unit is configured to calculate a pole of the beat signal for each reflected signal, and
the complex amplitude calculation unit calculates a complex amplitude corresponding to each pole,
the radar apparatus further comprising
an azimuth calculation unit configured to calculate an azimuth of the target object based on a phase rotation speed of each complex amplitude.

3. The radar apparatus of claim 1, wherein an intensity of the reflected signal is associated with a size, a shape, and a material of the target object.

4. The radar apparatus of claim 1, wherein a scattering cross section of the target object is proportional to the scattering intensity of the target object.

5. An object detection method comprising:
transmitting a chirp signal;
receiving a reflected signal that is the chirp signal reflected by a target object;
calculating a beat signal based on the chirp signal and the reflected signal and calculating a plurality of poles of the beat signal by eigenvalue decomposition of an autocorrelation matrix of the beat signal;
calculating a complex amplitude of a pole having an absolute value component less than a preset threshold value among the plurality of the poles by using a least squares method between a basis waveform corresponding to the pole and the beat signal;
calculating a distance to the target object based on the beat signal; and
calculating a scattering intensity of the target object as a square of an absolute value of the complex amplitude.

6. A non-transitory computer-readable storage medium storing an object detection program, wherein executing of the object detection program causes one or more computers to perform operations comprising:
transmitting a chirp signal;
receiving a reflected signal that is the chirp signal reflected by a target object;

calculating a beat signal based on the chirp signal and the reflected signal and calculating a plurality of poles of the beat signal by eigenvalue decomposition of an autocorrelation matrix of the beat signal;

calculating a complex amplitude of a pole having an absolute value component less than a preset threshold value among the plurality of the poles by using a least squares method between a basis waveform corresponding to the pole and the beat signal;

calculating a distance to the target object based on the beat signal; and calculating a scattering intensity of the target object as a square of an absolute value of the complex amplitude.

* * * * *